United States Patent
Klimek

[15] 3,653,721
[45] Apr. 4, 1972

[54] VARIABLE FRONT AXLE VALVE

[72] Inventor: Boleslaw Klimek, Des Plaines, Ill.

[73] Assignee: Berg Mfg. & Sales Co., Des Plaines, Ill.

[22] Filed: July 27, 1970

[21] Appl. No.: 58,551

[52] U.S. Cl. ............................................303/6 C, 137/102
[51] Int. Cl. ..................................B60t 15/36, G05d 11/03
[58] Field of Search................137/102; 188/151 A; 303/6 C, 303/6 R, 59, 62

[56] References Cited

UNITED STATES PATENTS

| | | |
|---|---|---|
| 3,420,256 | 1/1969 | Kobnick ..........................303/6 C UX |
| 3,492,052 | 1/1970 | Klimek....................303/6 C |
| 3,499,688 | 3/1970 | Reynolds..................303/6 C |
| 3,526,437 | 9/1970 | Lewis.......................303/6 C |
| 3,547,498 | 12/1970 | Bueler......................303/6 C |

*Primary Examiner*—Duane A. Reger
*Attorney*—Parker, Carter & Markey

[57] ABSTRACT

A front axle valve automatically effective to vary the pressures supplied from a fluid pressure brake system to the front axle brakes and having means for varying the relationship of system to brake pressure.

5 Claims, 2 Drawing Figures

PATENTED APR 4 1972　　3,653,721

INVENTOR.
Boleslaw Klimek
BY Parker, Carter & Markey
Attorneys.

VARIABLE FRONT AXLE VALVE

OBJECTS OF THE INVENTION

This invention relates to vehicle brake systems and particularly to a valve effective to vary the braking pressure supplied to front axle brakes during the course of vehicle brake application. One purpose of the invention is to provide a valve automatically effective to supply full system pressure to the front axle brakes in the initial portion of brake application, to supply a decreasing proportion of system pressure as brake application continues, to thereafter supply an increasing proportion of system pressure as brake application continues and thereafter to again supply full system pressure to the front axle brakes.

Another purpose is to provide a valve of the type described and having means adjustable to vary the timing of increased pressure delivery through the valve of the invention.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side elevation in cross section; and
FIG. 2 is a diagrammatic chart illustrating the operation of the invention.

Like parts are indicated by like numerals throughout the specification and drawings.

DESCRIPTION OF THE PREFERRED EMBODIMENT

Figure 1:
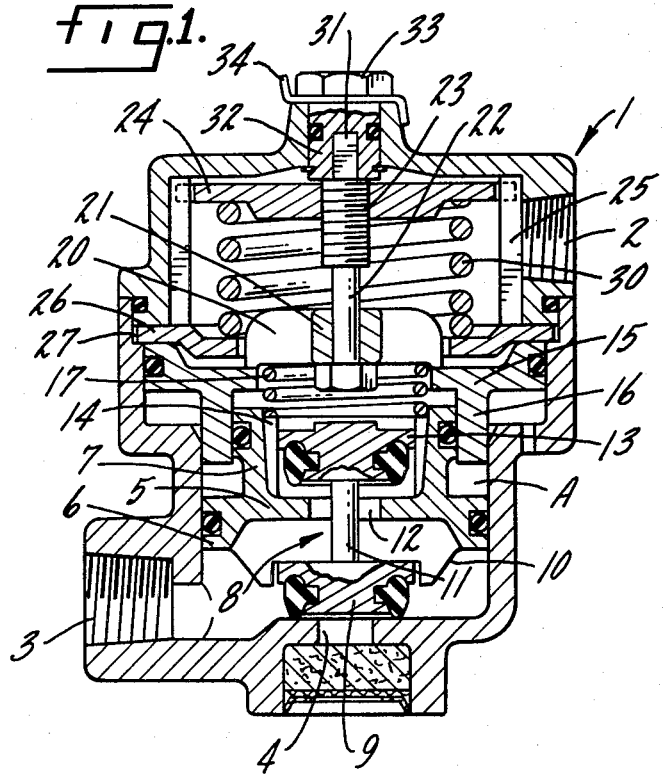

Referring now to the drawings, and particularly to FIG. 1, the numeral 1 generally designates a housing. An inlet port is shown at 2. An outlet port is shown at 3, it being understood that an outlet 3 would normally be provided for each of the front axle brakes and that the fluid pressure brake system of the vehicle would communicate with inlet 2.

Housing 1 defines an inner chamber A with which inlet 2, outlet 3 and an exhaust outlet 4 communicate. A differential piston 5 is reciprocal in chamber A having its major diameter portion 6 presented to outlet 3 and its smaller, cup-shaped diameter portion 7 presented to inlet 2. Floating within piston 5 is a dual-headed valve member 8 having a head 9 positioned for closing exhaust outlet 4 and urged thereagainst by circumferentially spaced, depending legs 10 of piston 5. A stem 11 of member 8 extends through aperture or passage 12 formed in piston 5 for communication of inlet 2 with outlet 3. The opposite valve head 13 of member 8 rides on circumferentially spaced guide vanes 14 and is in position to close the passage or aperture 12 in piston 5 to close communication between inlet 2 and outlet 3.

A piston 15 has a major diameter slidable within an expanded portion of chamber A, the major diameter of piston 15 being greater than diameter of piston 5 and being presented to inlet 2. Piston 15 carries circumferential ringlike axial extension or sleeve 16 within which the smaller diameter of piston 5 sealingly slides and which is in position to engage the larger diameter 6 of piston 5. A spring 17 engages a portion of piston 15 and piston 5 to urge the same in opposite directions.

Piston 15 carries a central web or spider 20 through which air may pass from inlet 2 to passage 12 and which carries a central hub 21. It will be observed that spring 17 seats against the radially disposed legs of web 20. A bolt 22 extends through hub 21 and has its head engaging the undersurface of hub 21, as the parts are shown. A threaded portion 23 of bolt 22 threadably engages a spring pressure plate 24 slidable in chamber A and having radial extensions slidable within circumferentially spaced guide vanes 25. A spring retainer plate 26 has its peripheral portion clamped between portions of housing 1, as indicated at 27. The plate 26 is centrally apertured for movement therethrough of web 20. A spring 30 of substantially greater force than that of spring 17 has its opposite ends in engagement with plates 24 and 26 to urge piston 15 in a direction away from piston 5.

Bolt 22 has its distal end 31 received within a plug 32 rotatable in an upper portion of housing 1. Plug 32 has a tool-engageable head 33 positioned externally of housing 1. Lock means 34 is provided to insure against unintentional rotation of plug 32.

The use and operation of the invention are as follows:

The basic operation of the valve of the invention may be fully understood by reference to my U.S. Pat. No. 3,492,052, entitled "Front Axle Valve" and issued Jan. 27, 1970. Fundamentally, system pressure delivered at inlet passes through passage 12 and outlets 3 to the front axle brakes of the vehicle. Full system pressure is thus transmitted in the initial portion of brake application, e.g. that portion required to move the brake shoes into engagement with the brake drums. Thereafter, as indicated by the line XY in FIG. 2, a decreasing portion of pressure delivered at inlet 2 is delivered at outlet 3 to the front axle brakes, the increasing system pressure building beneath the larger diameter of piston 5 presented to outlet 3 and causing movement of piston 5 and resulting diminution of passage 12. At a predetermined point the increased system pressure delivered at inlet 2 becomes effective against the larger piston 15 to move it downwardly and again move piston 5 away from valve head 13 to again open passage 12 and to provide an increasing proportion of system pressure to outlets 3 and to the front axle brakes.

Figure 2:
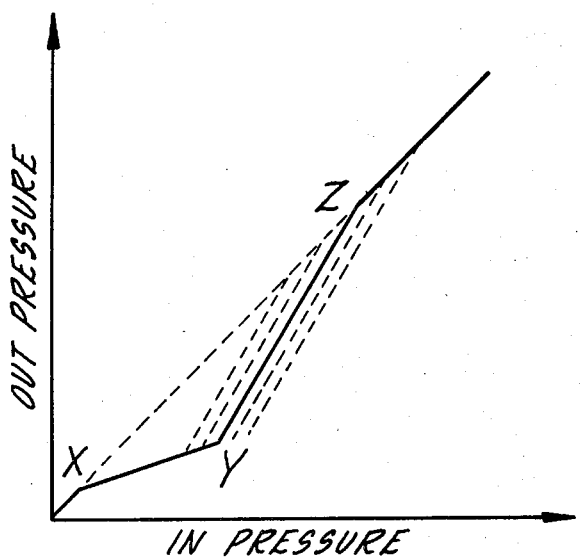

It will be observed that movement of piston 15 toward outlet 3 and piston 5 is restricted by spring 30, a spring of somewhat greater force than that of spring 17. In the valve of U.S. Pat. No. 3,492,052, referred to above, the point at which increasing pressures are delivered through outlets 3 and the point at which full system pressure is again delivered through the valve of the invention was fixed and is indicated in FIG. 2, for example, by the solid line YZ. In the present invention the spring 30 may be prestressed by rotation of head 33, plug 32 and bolt 22 to draw plate 24 downwardly, as the parts are shown in the drawings, and thus to compress spring 30 between plate 24 and fixed retainer or abutment plate 26. Thus the pressures passing through housing 1 and the relationships and timing of changes from full to decreasing to increasing to full system pressures may be modulated as desired as indicated by the dotted lines in FIG. 2, movement of plate 24 toward abutment 26 being effective to prestress spring 30 and thus to move the line YZ to the right in reference to FIG. 2.

The embodiments of the invention in which an exclusive property or privilege is claimed are defined as follows:

1. A valve including a housing, an inlet, an outlet, a differential piston reciprocal in said housing between said inlet and said outlet, said piston having a smaller surface presented to said inlet and a larger surface presented to said outlet, a passage through said piston communicating said inlet and outlet, a valve element positioned to control said passage, yielding means urging said differential piston toward passage-open position, and a second piston, said second piston having a surface presented to said inlet and larger than either surface of said differential piston, said second piston having a portion engageable with said differential piston to urge said differential piston toward said passage-open position in response to delivery of fluid pressure at said inlet above a predetermined level, and means available externally of said housing for varying the reaction of said second piston at predetermined levels of fluid pressure at said inlet.

2. The structure of claim 1 wherein said last-named means includes a spring urging said second piston away from said differential piston and means for prestressing said spring.

3. The structure of claim 2 wherein said prestressing means includes a plate slidable in said housing and means rotatably engaging said plate and effective to urge said plate against the action of said spring to stress the same.

4. The structure of claim 1 wherein said last-named means includes a spring having one of its ends engaging an abutment fixed in said housing, a plate carried by said piston and engaging the opposite end of said spring and means for moving said plate toward said abutment to compress said spring.

5. The structure of claim 1 wherein said yielding means engages said differential and said second piston to urge said pistons in opposite directions.

* * * * *